United States Patent
Cooper et al.

(10) Patent No.: US 11,485,186 B2
(45) Date of Patent: Nov. 1, 2022

(54) SPRING SEAT BRACKET FOR VEHICLE SUSPENSION

(71) Applicant: Ford Global Technologies, LLC, Dearborn, MI (US)

(72) Inventors: Jack Wiley Cooper, Novi, MI (US); Sean McMahon Conway, Dearborn, MI (US); Andrew Barry Lane, Ypsilanti, MI (US); Justin Applegate, Walled Lake, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/197,537

(22) Filed: Mar. 10, 2021

(65) Prior Publication Data

US 2022/0288987 A1    Sep. 15, 2022

(51) Int. Cl.
*B60G 11/16*    (2006.01)

(52) U.S. Cl.
CPC ........ *B60G 11/16* (2013.01); *B60G 2200/142* (2013.01); *B60G 2200/32* (2013.01); *B60G 2204/1244* (2013.01); *B60G 2204/61* (2013.01)

(58) Field of Classification Search
CPC .............. B60G 11/16; B60G 2200/142; B60G 2200/32; B60G 2204/1244; B60G 2204/61; B60G 15/067; B60G 15/07; B60G 2204/124
See application file for complete search history.

(56) References Cited

U.S. PATENT DOCUMENTS

| | | | | |
|---|---|---|---|---|
| 2,896,940 A * | 7/1959 | Lightbourn | .......... | B60G 17/021 267/254 |
| 3,781,033 A * | 12/1973 | Buchwald | ............ | B60G 17/021 280/6.157 |
| 4,962,834 A * | 10/1990 | Miner | .................... | B60G 11/16 188/321.11 |
| 5,263,694 A * | 11/1993 | Smith | .................. | B60G 15/068 267/162 |
| 6,196,564 B1 * | 3/2001 | Hawener | .................. | B60G 7/04 280/124.162 |
| 6,244,604 B1 * | 6/2001 | McIntyre | ............... | B62D 17/00 280/86.753 |

(Continued)

FOREIGN PATENT DOCUMENTS

| DE | 19818698 A1 * | 6/1999 | ............. | B60G 9/003 |
|---|---|---|---|---|
| EP | 2990240 A1 * | 3/2016 | ............. | B60G 7/001 |

(Continued)

OTHER PUBLICATIONS

Machine translation of EP2990240 (Year: 2016).*

*Primary Examiner* — Paul N Dickson
*Assistant Examiner* — Kurtis Nielson
(74) *Attorney, Agent, or Firm* — Burr & Forman LLP; Greg Brown (57) ABSTRACT

A suspension assembly for a vehicle may include a wheel support structure operably coupling a wheel to the suspension assembly, a bolt-in spring seat bracket operably coupled to the wheel support structure, and a spring supported by the bolt-in spring seat bracket and disposed between a chassis of the vehicle and the bolt-in spring bracket. The bolt-in spring seat bracket may be adjustable to change a ride height of the vehicle.

18 Claims, 8 Drawing Sheets

(56) References Cited

U.S. PATENT DOCUMENTS

| | | | | |
|---|---|---|---|---|
| 6,267,397 B1* | 7/2001 | Hamada | ................... | B60G 9/02 |
| | | | | 280/124.128 |
| 9,211,775 B1* | 12/2015 | Ryshavy | ................ | B60G 11/16 |
| 2006/0108761 A1* | 5/2006 | Lamb | ..................... | B60G 11/16 |
| | | | | 280/124.1 |
| 2008/0018065 A1* | 1/2008 | Hirao | ................... | B60G 17/021 |
| | | | | 280/6.157 |
| 2016/0121686 A1* | 5/2016 | Botello | ............... | B60G 17/021 |
| | | | | 280/6.157 |
| 2018/0334003 A1* | 11/2018 | Kraus | .................... | B60G 17/00 |
| 2019/0359021 A1* | 11/2019 | Szymanski | .......... | B60G 17/021 |

FOREIGN PATENT DOCUMENTS

| | | | | | |
|---|---|---|---|---|---|
| KR | 20170030568 | A | * | 3/2017 | ............. B60G 15/07 |
| KR | 20170094031 | A | * | 8/2017 | |
| WO | WO-0027657 | A1 | * | 5/2000 | ............... B60G 9/02 |
| WO | WO-2011154085 | A1 | * | 12/2011 | ............. B60G 15/06 |
| WO | WO-2021078909 | A1 | * | 4/2021 | ........... B60G 17/005 |

\* cited by examiner

SPRING SEAT BRACKET FOR VEHICLE SUSPENSION

TECHNICAL FIELD

Example embodiments generally relate to vehicle suspension and, more particularly, relate to a suspension system that employs spring seat brackets that provide flexibility in modifying vehicle suspension characteristics.

BACKGROUND

There are a wide variety of options for designing and building vehicle suspensions. However, for any particular vehicle model or design, one of those options is typically selected for all variants of the model. In this regard, drives to keep costs down generally restrict the ability of designers to substitute entirely different suspension components for corresponding different vehicle variants. Thus, for example, it may be difficult to design models for which respective vehicle variants have different ride height characteristics.

As a result of these restrictions on vehicle manufacturers, most significant modification options that exist in the marketplace are associated with aftermarket products. Many of these products require dedicated aficionados or experts to take the initiative in making such modifications themselves. Accordingly, there remains a need for efficient options to give greater variation capability in providing different ride heights for different variants.

BRIEF SUMMARY OF SOME EXAMPLES

In accordance with an example embodiment, a suspension assembly for a vehicle may be provided. The suspension assembly may include a wheel support structure operably coupling a wheel to the suspension assembly, a bolt-in spring seat bracket operably coupled to the wheel support structure, and a spring supported by the bolt-in spring seat bracket and disposed between a chassis of the vehicle and the bolt-in spring bracket. The bolt-in spring seat bracket may be adjustable to change a ride height of the vehicle.

In another example embodiment, a vehicle suspension system may be provided. The vehicle suspension system may include a first suspension assembly operably coupling a first wheel to a chassis of a vehicle, and a second suspension assembly operably coupling a second wheel to the chassis. Each of the first and second suspension assemblies may include a wheel support structure operably coupling the first and second wheels to the first and second suspension assemblies, respectively, a bolt-in spring seat bracket operably coupled to the wheel support structure, and a spring supported by the bolt-in spring seat bracket and disposed between a chassis of the vehicle and the bolt-in spring bracket. The bolt-in spring seat bracket may be adjustable to change a ride height of the vehicle.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3, which is defined by FIGS. 3A and 3B, illustrates top and bottom perspective views of the bolt-in spring seat bracket in accordance with an example embodiment;

FIG. 4, which is defined by FIGS. 4A and 4B, illustrates perspective views of a perch in accordance with an example embodiment;

FIG. 5, which is defined by FIGS. 5A and 5B, illustrates perspective views of a bracket body in accordance with an example embodiment;

FIG. 6, which is defined by FIGS. 6A and 6B, illustrates side views of two interface structures formed in the bracket body in accordance with an example embodiment;

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, typical design limitations and pressures necessarily result in vehicle variants that have relatively small differences in ride height. However, some vehicle models may benefit greatly from providing more variation in ride height, particularly if this can be achieved in a cost effective way. In this regard, vehicle models that are expected to have large suspension travels may benefit greatly from these improvements. For example, the springs of the rear suspension of such vehicles may be highly optimized to support large suspension travels. As a result, neither the springs themselves nor other components of the rear suspension may be easily adjustable to provide ride height changes across different variants. Fine tuning of ride heights, such as to adjust for even small weight changes proposed for different variants, therefore becomes nearly impossible to do in any economically feasible way.

Example embodiments provide an increased measure of flexibility in this regard by providing bolt-in spring seat brackets. Because the spring seats are bolted to the brackets, there is increased flexibility introduced by virtue of the capability for the adjustability desired to be designed into the structure of the brackets, the spring seats themselves, and/or the interface between the spring seats and the brackets.

Figure 1:
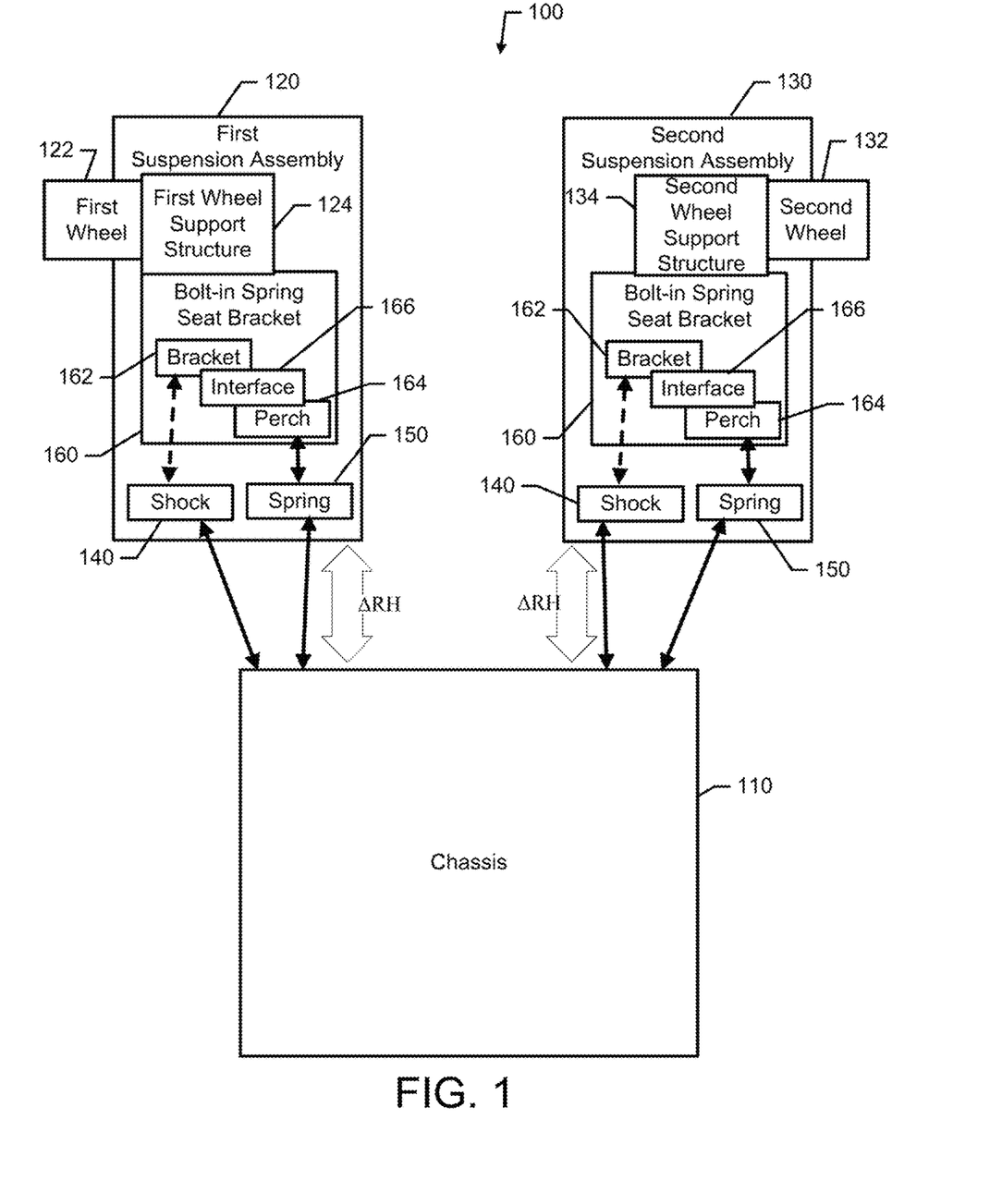
FIG. 1 is a block diagram of a vehicle employing a suspension system in accordance with an example embodiment.

FIG. 1 is a block diagram of a vehicle employing a suspension system in accordance with an example embodiment. As shown in FIG. 1, the vehicle 100 may include a chassis 110. A first suspension assembly 120 may support a first wheel 122, and a second suspension assembly 130 may support a second wheel 132. More particularly, a first wheel support structure 124 of the first suspension assembly 120 may support the first wheel 122, and a second wheel support structure 134 of the second suspension assembly 130 may support the second wheel 132. The first and second suspension assemblies 120 and 130 may substantially mirror each other in arrangement and may form portions of the suspension system of an example embodiment.

The first and second suspension assemblies 120 and 130 may operably couple the first and second wheels 122 and 132 to the chassis 110, and may take a number of different forms. Example embodiments may be practiced in connection with many of these specific forms. The specific forms may include, for example, multi-link suspensions, trailing arm suspensions, double wishbone suspensions (i.e., with upper and lower control arms), solid axle suspensions and many more. Thus, the first and second wheel support structures 124 and 134 may include a steering knuckle, hub, spindle or the like, which may be employed in connection with various types of suspensions noted above, or others.

The first and second suspension assemblies 120 and 130 may each include one or more instances of a shock absorber or shock 140 (e.g., a gas shock) and a spring 150. The gas shock 140 and the spring 150 may be mounted between the chassis 110 and a mounting point located at some other component of the first and second suspension assemblies 120 and 130. For example, in a multi-link suspension, the mounting point could be one of the links. In a double wishbone suspension, the mounting point could be one of the control arms. In a solid axle suspension, the mounting point could be an axle tube. However, it will be appreciated that other mounting points may be selected for these and other suspensions.

Example embodiments provide the introduction of bolt-in spring seat brackets 160 that may introduce significant flexibility into the design process in terms of changing ride heights between variants. The bolt-in spring seat bracket 160 of an example embodiment may include a bracket 162, a perch 164 (which defines the seat surface for the spring 150) and an interface 166 between the bracket 162 and the perch 164. The bracket 162 may have a fixed connection to a portion of the first or second suspension assembly 120 and 130, and the perch 164 may be connected to, and support, the spring 150. Thus, the bolt-in spring seat bracket 160 defines part of the structural interface between the suspension assembly (e.g., the first or second suspension assembly 120 or 130) and the chassis 110. Although not required, and not always the case, the bolt-in spring seat brackets 160 may sometimes support both the shock 140 and the spring 150.

In an example embodiment, the first and second wheels 122 and 132 may be rear wheels, and thus FIG. 1 may illustrate a rear suspension of the vehicle 100. However, in another example embodiment, the first and second wheels 122 and 132 may be front wheels, and thus FIG. 1 may illustrate a front suspension. In still other cases, the components shown in FIG. 1 may be duplicated to apply to both the front and rear suspension of the vehicle 100.

As shown in FIG. 1, variation or change in ride height (ΔRH) may be achieved by adjusting the bolt-in spring seat brackets 160. Thus, for example, in some cases the change in ride height (ΔRH) may be achieved without changing out the spring 150, the shock 140, or any other components of the first or second suspension assemblies 120 and 130. In such cases, the interface 166 may provide the ability to adjust the ride height using the same instance of the bracket 162 and the perch 164, but simply mounting the perch 164 differently relative to the bracket 162 (by virtue of structural characteristics of the interface 166). Meanwhile, in other examples, a different instance of the perch 164 may be employed defining a different ride height. Thus, as will be discussed in greater detail below, the designs of any or all of the bracket 162, the perch 164 and the interface 166 may be such that using the same or different instances of the bracket 162, perch 164 and interface 166 may allow multiple ride height configurations to be achieved. The way this is achieved will be described in greater detail below in reference to some specific structural examples.

Figure 2:
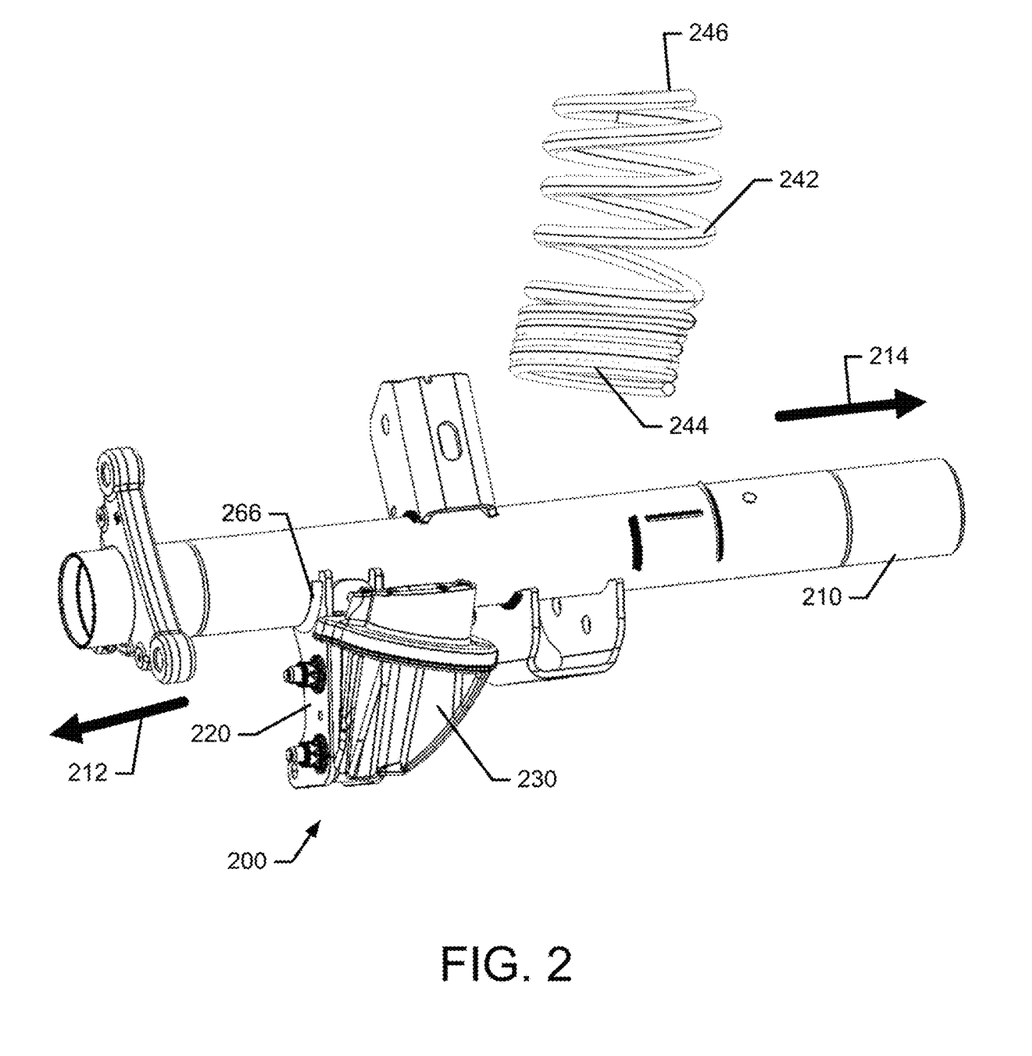
FIG. 2 illustrates a perspective view of a suspension system of a vehicle having a bolt-in spring seat bracket in accordance with an example embodiment.

Referring now to FIG. 2, a specific structure for one example embodiment of the bolt-in spring seat brackets 160 of FIG. 1 will be described. In this regard, FIG. 2 shows an isolated view of a bolt-in spring seat bracket 200 and some other components located nearby to the bolt-in spring seat bracket 200. The bolt-in spring seat bracket 200 of this example is operably coupled to a portion of an axle tube 210. However, as noted above, the bolt-in spring seat bracket 200 could alternatively be mounted on other structures in other types of suspension. To provide a frame of reference, arrow 212 points in the direction of a wheel (e.g., a left rear wheel), which may be supported by structures of the first suspension assembly 120 described above in reference to FIG. 1. Meanwhile, arrow 214 points in the direction of another wheel (e.g., a right rear wheel) that is disposed at the other end of the axle tube 210 on the opposite side of the vehicle. In some cases, a differential (e.g., a rear differential) may also be disposed in the direction of arrow 214 just out of the scope of the view shown in FIG. 2.

As shown in FIG. 2, the bolt-in spring seat bracket 200 may include a bracket body 220 (an example of bracket 162 of FIG. 1) and a perch 230 (an example of perch 164 of FIG. 1). Various other components or features of the perch 230 and the bracket body 220 that will be described in greater detail below may form an interface that operably couples the bracket body 220 to the perch 230. Thus, the interface may be defined at least in part by features or components located at each of the perch 230 and the bracket body 220.

The bracket body 220 of this example includes a first plate 222 and a second plate 224. The perch 230 may include a seat portion 232 on which a spring 242 may be seated. The seat portion 232 may surround a cupped portion 234 that may provide support to the spring 242, and keep the spring 242 properly located on the seat portion 232. The spring 242 in this example is removed from the seat portion 232 to provide a better view of the cupped portion 234. However, it will be appreciated that a proximal end 244 of the spring 242 sits on the seat portion 232 and surrounds the cupped portion 234 when assembled. The other end (i.e., a distal end 246) of the spring 242 may be operably coupled to the chassis of the vehicle.

Figure 3A:
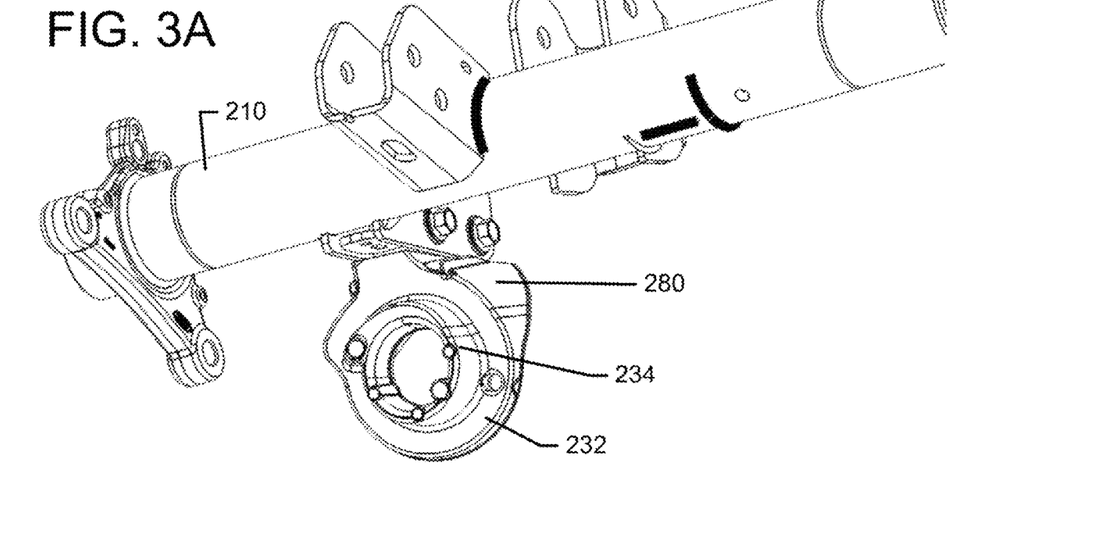
Figure 3B:
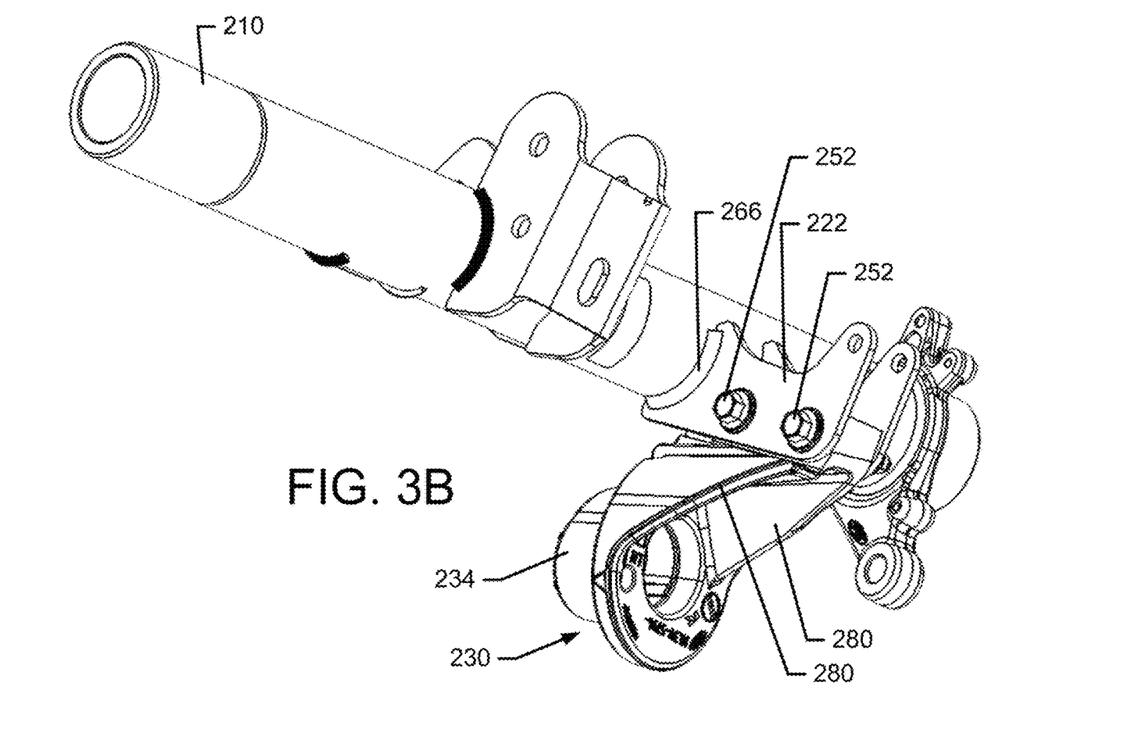
Figure 4A:
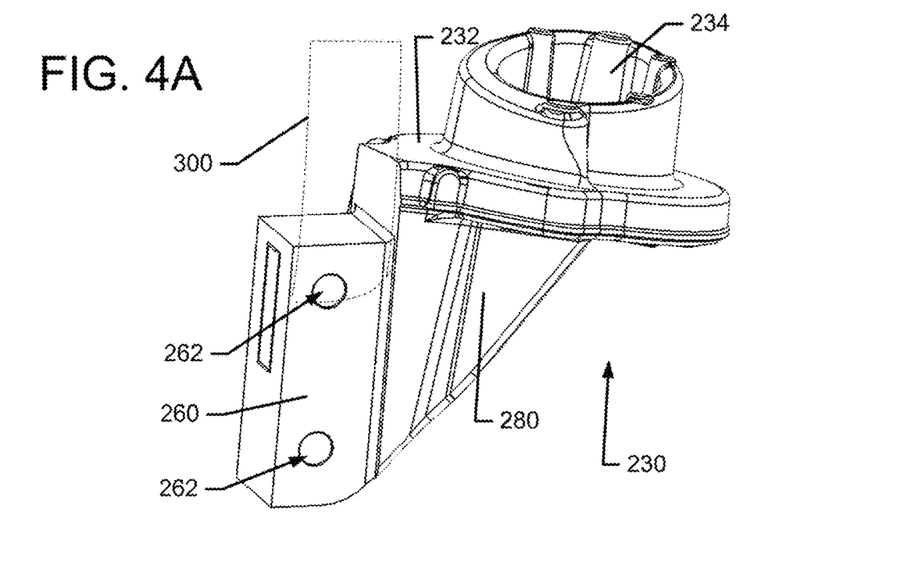
Figure 4B:
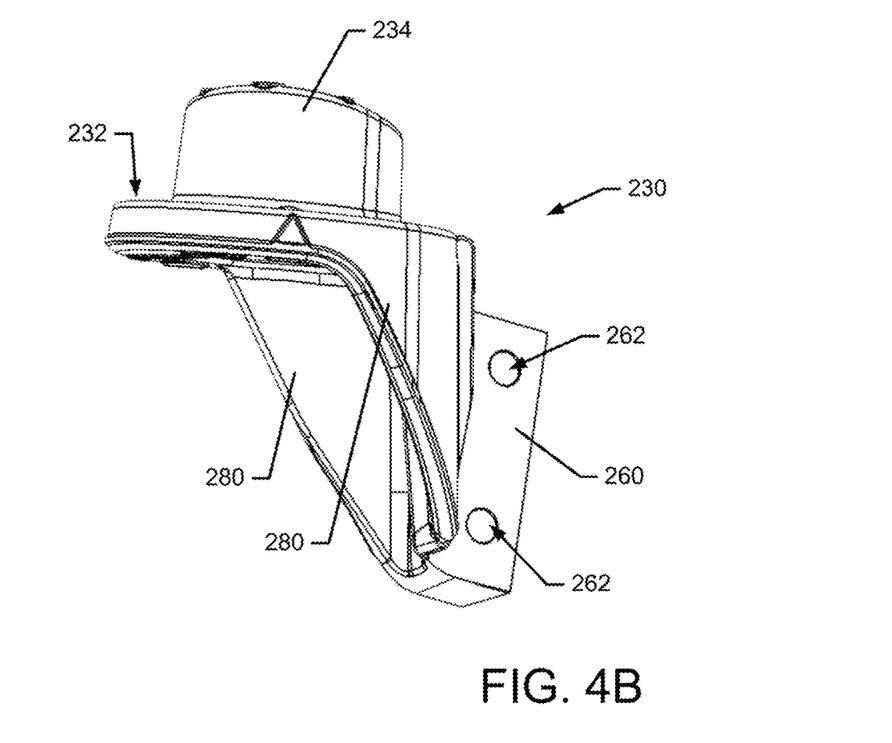
Figure 5A:
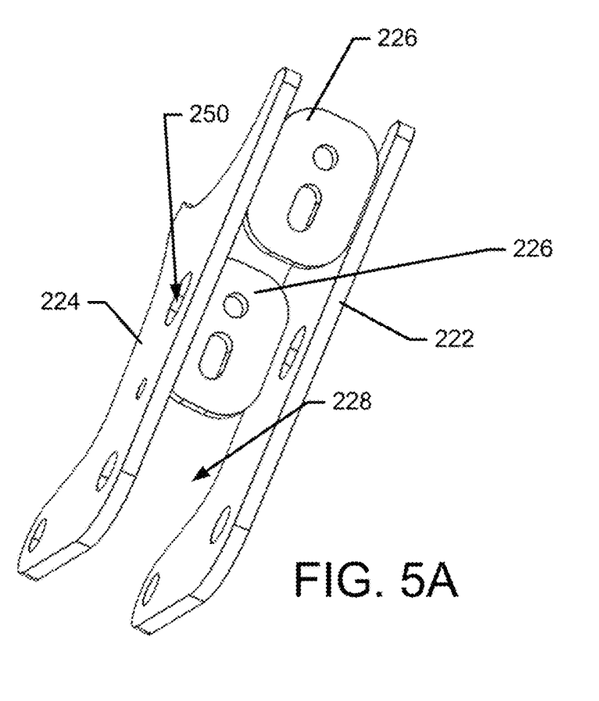
Figure 5B:
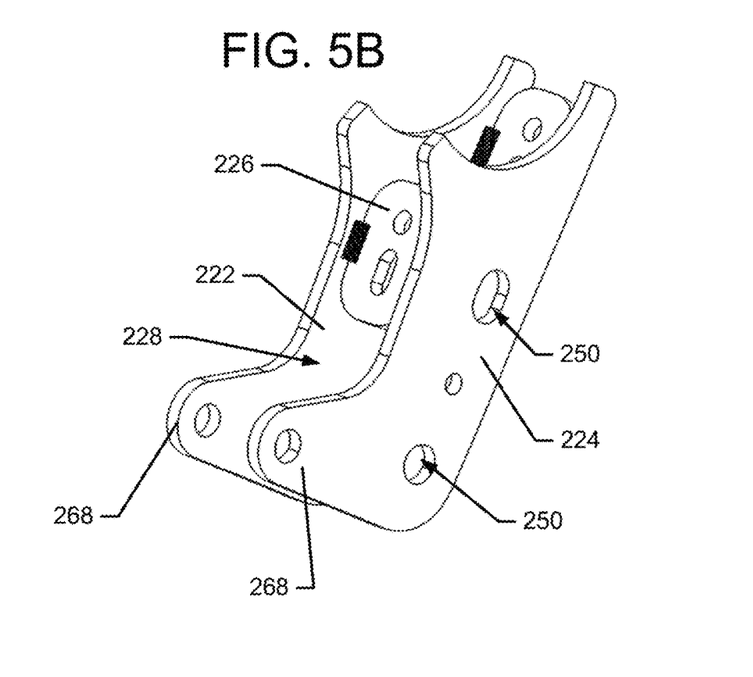

FIG. 3, which is defined by FIGS. 3A and 3B, illustrates different perspective views of the bolt-in spring seat bracket 200. Meanwhile, FIG. 4, which is defined by FIGS. 4A and 4B, shows different perspective views of the perch 230 in isolation. FIG. 5, which is defined by FIGS. 5A and 5B, shows different perspective views of the bracket body 220 in isolation. Both FIGS. 4 and 5 include portions of the interface, as will be described in greater detail below.

Referring now to FIGS. 2-5, the bracket body 220 can be appreciated to be a clevis-type bracket that forms a U-shaped channel between the first and second plates 222 and 224. The first and second plates 222 and 224 extend in planes that are substantially parallel to each other, and are separated from each other by one or more spacers 226. In this example, the spacers 226 extend substantially perpendicular to the first and second plates 222 and 224 to define a receiving space 228 between the first and second plates 222 and 224. The receiving space 228 may be a volume that forms part of the interface in that a portion of the perch 230 may fit into the receiving space 228 in order to be secured to the bracket body 220. Thus, for example, the first and second plates 222 and 224 may include fastener reception orifices 250 that are aligned with each other to permit a fastener 252 to be passed therethrough. Thus, the fastener reception orifices 250 and/or the fastener 252 may form part of the interface.

As shown in FIG. 4, the perch 230 may include a mating portion 260 that is shaped to fit into the receiving space 228. The mating portion 260 may include through holes 262 that receive the fastener 252 to retain the mating portion 260 in connection with the bracket body 220. Thus, the mating portion 260 (or at least the through holes 262 thereof) may also form a portion of the interface in some cases.

The bracket body 220 of this example is operably coupled to the axle tube 210 via a welded joint 266 formed at a proximal end of the first and second plates 222 and 224. However, other joining methods could alternatively be employed (e.g., fasteners, clamping assemblies, etc.). The bracket body 220 also includes two sets of fastener reception orifices 250, but it should be appreciated that either more or fewer fastener reception orifices 250 and corresponding through holes 262 and fasteners 252 may be used in other embodiments. It should also be appreciated that although a clevis-type bracket is shown as the bracket body 220, and therefore the interface of this example provides a double shear mounting of the perch 230 to the bracket body 220, other mounting methods could be used in other embodiments. For example, only one of the first or second plates 222 or 224 could be employed, and the mating portion 260 could be mated alongside the single plate in a single shear mounting (see FIG. 8 for such an example). Mounting could also be performed with fasteners in tension or compression as well (i.e., with the fasteners running parallel to the plate or plates instead of perpendicular thereto).

In the example of FIGS. 2-5, the first and second plates 222 and 224 each mirror each other in shape, and are substantially flat and planar steel members. However, other shapes and materials could be used. In this example, the mounting portion 260 is substantially rectangular prism shaped in order to fit in the receiving space 228, and provide two vertically spaced apart through holes 262 to match with two vertically spaced apart fastener reception orifices 250 disposed proximate to a linear or flat edge of the first and second plates 222 and 224. However, again, other shapes could be substituted in some cases. Additionally, it is noteworthy that this example further includes a tail portion 268 that extends away from the receiving space 228. The tail portion 268 includes reception holes that are configured to support a fastener that operably couples the bracket body 220 to a shock absorber (e.g., shock 150 of FIG. 1). The tail portion 268 is entirely optional, and may not be included in some embodiments where the bracket body 220 does not perform the double function of supporting both the spring 242 and the shock absorber.

The perch 230 may be defined by the seat portion 232, the cupped portion 234, the mounting portion 260 and one or more support arms 280. In an example embodiment, the mounting portion 260 may include features that define the interface. In an example embodiment, the perch 230 (and some portions of the interface) may all be one unitary piece of material. Thus, in an example embodiment, the perch 230 (i.e., the seat portion 232, the cupped portion 234, the mounting portion 260 and the support arms 280) may be a single cast metallic component. For example, the perch 230 may be cast aluminum, magnesium, composite materials, and/or the like, and the interface may be defined by the slots, holes or other portions formed at the perch 230 that enable connection of the perch 230 to the bracket body 220. By being cast instead of stamped, less stamping tools may be involved in manufacture of vehicle components and fewer assembly and weld operations may be required for vehicle assembly.

The seat portion 232 may be an annular surface that is substantially planar and concentric with the cupped portion 234. The cupped portion 234 may have a through hole passing through a center thereof in some cases to minimize the amount of metallic material used to make the perch 230. The interface may be defined by features of the mounting portion 260 that engage the bracket body 220. However, in some cases, the way the mounting portion 260 and support arms 280 interact with or relate to each other may also be considered to be part of the interface. In some embodiments, the support arms 280 may extend from alongside all or most of one side of the mounting portion 260 to an underside of the seat portion 232. Moreover, as noted above, one a single instance of the support arms 280 may be employed in some cases. The support arms 280 may support the seat portion 232 and carry the weight of the spring 242 and any force exerted through the spring 242 and onto the seat portion 232. In some cases, a plane in which the seat portion 232 lies may be at an angle of about 90 degrees relative to the longitudinal centerline of the mounting portion 260. However, the angle could alternatively be slightly larger or smaller (e.g., +/−30 degrees in some cases). The support arms 280 may be correspondingly shortened or lengthened to accommodate the different options for angular separation between the seat portion 232 and the mounting portion 260.

In the example of FIG. 4, the seat portion 232 lies entirely above the mounting portion 260. This structure dictates that the support arms 280 are entirely on only one side of the seat portion 232 (i.e., below in this example). However, it should be appreciated that the mounting portion 260 could be positioned either lower (extending the length of the support arms 280) or higher (shortening the length of the support arms 280) in other examples. Moreover, the mounting portion 260 could be positioned high enough in some cases that some or all of the support arms 280 may be positioned to extend above the seat portion 232. For example, FIG. 4A shows an alternative location 300 for the mounting portion 260 which may result in some portion of the support arms 280 being above the seat portion 232 and some portion of the support arms 280 being below the seat portion 232.

As noted above, example embodiments may enable significant changes in ride height to be possible through the structure of the bolt-in spring seat bracket 200. In this regard, different ride heights may result from using differently structured perches, brackets and/or interfaces. In some cases, different interchangeable perches may be employed with the same bracket body 220 to achieve different ride heights. For example, a first perch (e.g., perch 230) may be cast to have a given relationship between the seat portion 232 and the mounting portion 260 such as the relationship shown in FIG. 4A. However, another perch may be cast with a different interface based on having a different relationship between the seat portion 232 and the mounting portion 260. In this regard, for example, the mounting portion 260 may be moved to the alternative location 300 of FIG. 4A. The ride height will be lower for the perch associated with the alternative location 300 for the mounting portion. Each perch may be cast separately with a selected relationship between the mounting portion and the seat portion, and ride height can be selected based on which perch is chosen for a given vehicle. The bracket body 220 may otherwise be the same.

Figure 6A:
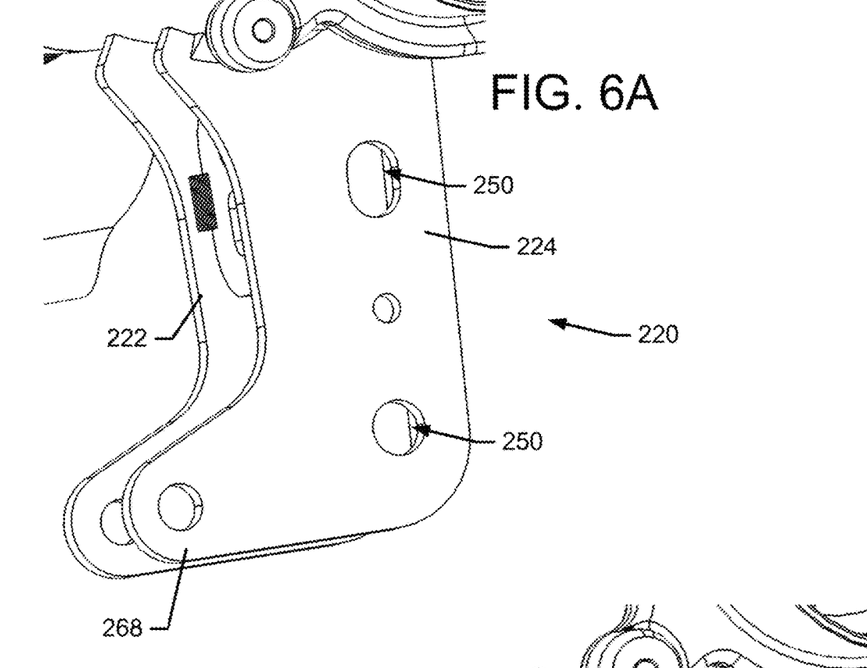
Figure 6B:
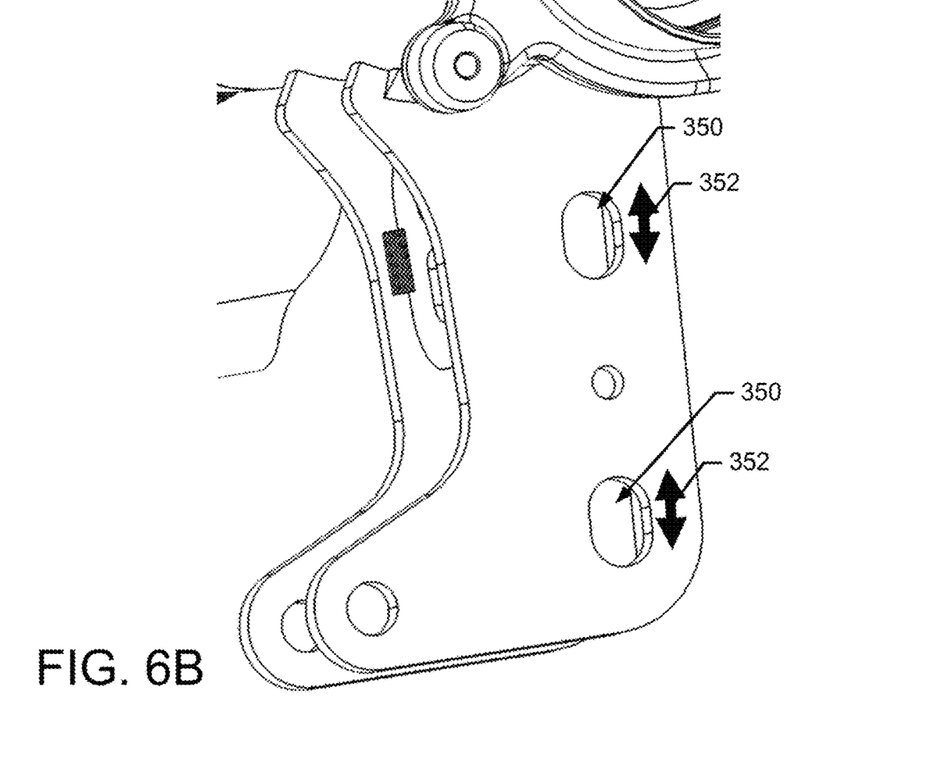

Other ways to modify ride height may include making the mounting relationship between the same perch and bracket adjustable by using elongated through holes 262 and/or fastener reception orifices 250 that define the interface. In this regard, FIG. 6A illustrates a side by side comparison of changes made to the fastener reception orifices 250 of the example of FIGS. 2-5 (shown in FIG. 6A) which include at least one of the fastener reception orifices 250 having a round shape slightly larger in diameter than the fastener 252. Meanwhile, FIG. 6B shows alternatively shaped fastener reception orifices 350 that have an elongated or slot shape that permits moving or sliding of the fastener 252 up or down (as shown by arrow 352). The fastener 252 may slide up or down in the fastener reception orifices 350 of FIG. 6B and be tightened at a specific location to define different ride heights. Meanwhile, in the example of FIG. 6A, the fastener 252 cannot be slid up or down since at least the bottom fastener reception orifice 250 does not permit any such sliding.

Figure 7:
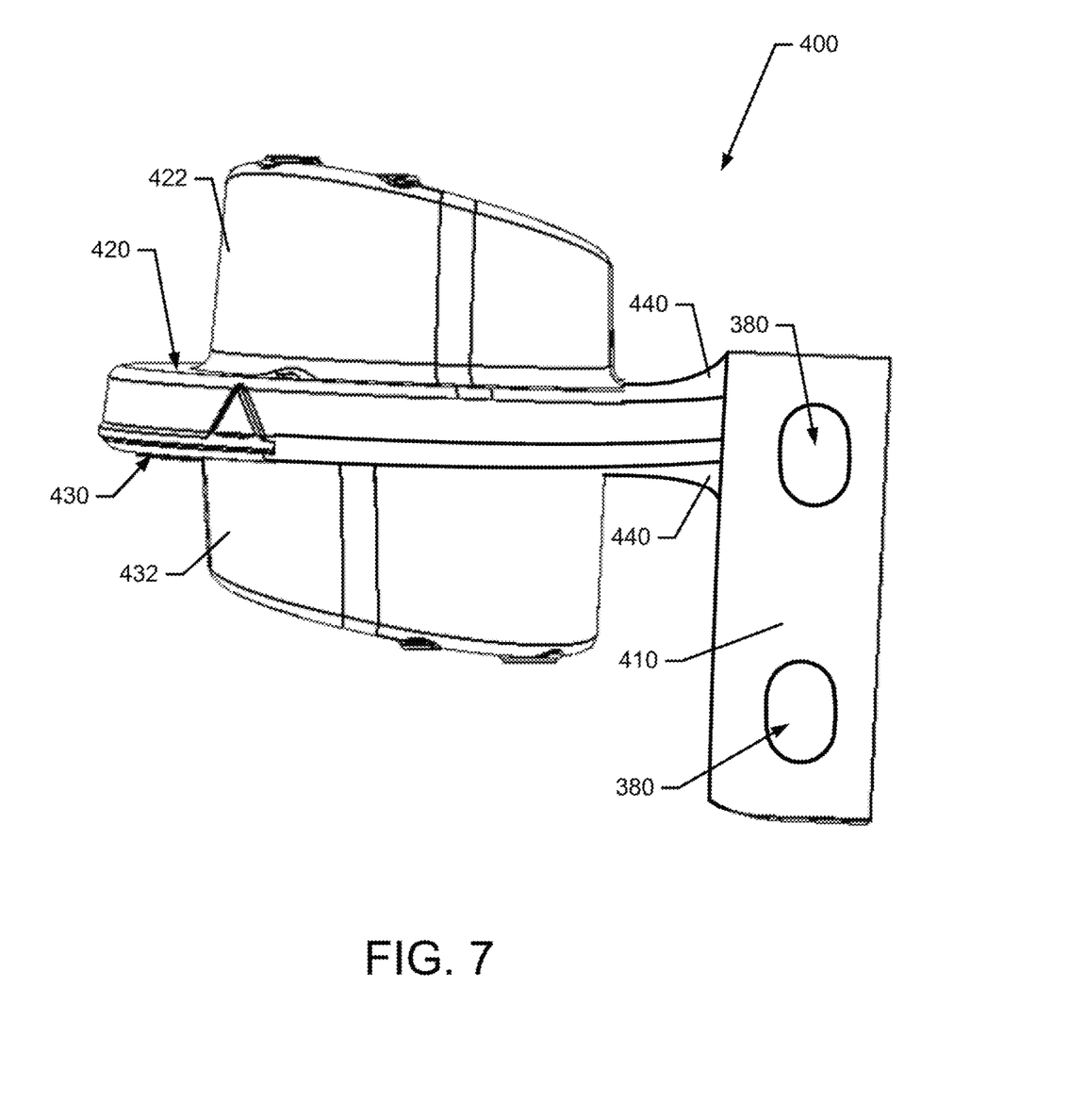
FIG. 7 illustrates a side view of a bolt-in spring seat bracket with two seat portions in accordance with an example embodiment.

In addition, or as an alternative, to placing slots permitting sliding in the bracket body 220 (as shown in FIG. 6B), elongated through holes may be provided in the mounting portion 260. In this regard, although FIG. 4 shows the through holes 262 as being round (substantially matching the diameter of the fastener 252) so that no adjustment is possible, FIG. 7 shows through holes 380 that are elongated or slotted. The through holes 380 of FIG. 7 may allow the fastener 252 to be slid up and down before tightening to define different ridge heights.

Thus, the examples of FIGS. 6B and 7 show two different adjustment paradigms regarding the adjustability of the interface. In this regard, for example, the through holes 380 may have an elongated shape in a vertical direction to enable the fasteners(s) 252 to be raised or lowered in the through holes 380 prior to affixing the mounting portion 260 to the bracket body 220 at the selected ride height. Alternatively (or additionally), the fastener reception orifices 350 formed in the first and second plates 222 and 224 may have an elongated shape in the vertical direction to enable the fastener(s) 252 to be raised or lowered in the fastener reception orifices 350 prior to affixing the mounting portion 260 to the bracket body 220 at the selected ride height. The affixing may include tightening of a nut onto a bolt to clamp the bracket body 220 in contact with the mounting portion 260 at a given relationship therebetween which dictates a corresponding change in the ride height.

Still other structural changes may enable adjustment of ride heights as well, and one such change is further shown in the example of FIG. 7. In this regard, FIG. 7 shows an example perch 400 that has multiple adjustment options built into the same structure. In this regard, in addition to having the slotted or elongated through holes 380 mentioned above, the perch 400 has a reversible structure that includes two different seat portions that define respective different ride heights. In this regard, mounting portion 410 (which includes the through holes 380) is operably coupled to two different seat portions including a first seat portion 420 that is oriented in a first direction (i.e., upward in this example) and a second seat portion 430 that is oriented in a second direction (i.e., downward in this example). A first cupped portion 422 is associated with the first seat portion 420, and a second cupped portion 432 is associated with the second seat portion 430. The first and second cupped portions 422 and 432 may be coaxial in some cases, or the axes may be offset relative to one another dependent on the relationship between the first and second seat portions 420 and 430. Moreover, the first and second seat portions 420 and 430 may either lie in planes that are parallel to each other, or lie in planes that are not parallel to each other.

The mounting portion 410 may be operably coupled to the first and second seat portions 420 and 430 in such a way as to enable flipping or rotating of the perch 400 to define two different ride heights. Thus, the location of the first and second seat portions 420 and 420 must be such that they are not equidistant from and on opposite sides of the midpoint (longitudinally) of the mounting portion 410. Accordingly, by mounting the perch 400 in the orientation shown in FIG. 7, a relatively high ride height may be achievable (which may be adjusted to a smaller degree based on moving the position of the fastener 252 within the elongated through holes 380 before tightening). Meanwhile, by flipping the perch 400 upside down relative to the orientation shown in FIG. 7, a relatively low ride height may be achievable (which may be adjusted to a smaller degree based on moving the position of the fastener 252 within the elongated through holes 380 before tightening). Thus, a course adjustment and a fine adjustment for ride height is possible using the structure of FIG. 7. As can also be appreciated from FIG. 7, support arms 440 may be made relatively small. Moreover, in the example of FIG. 7, the support arms 440 support the perch 400 in a cantilevered relationship relative to the mounting portion 410.

Figure 8:
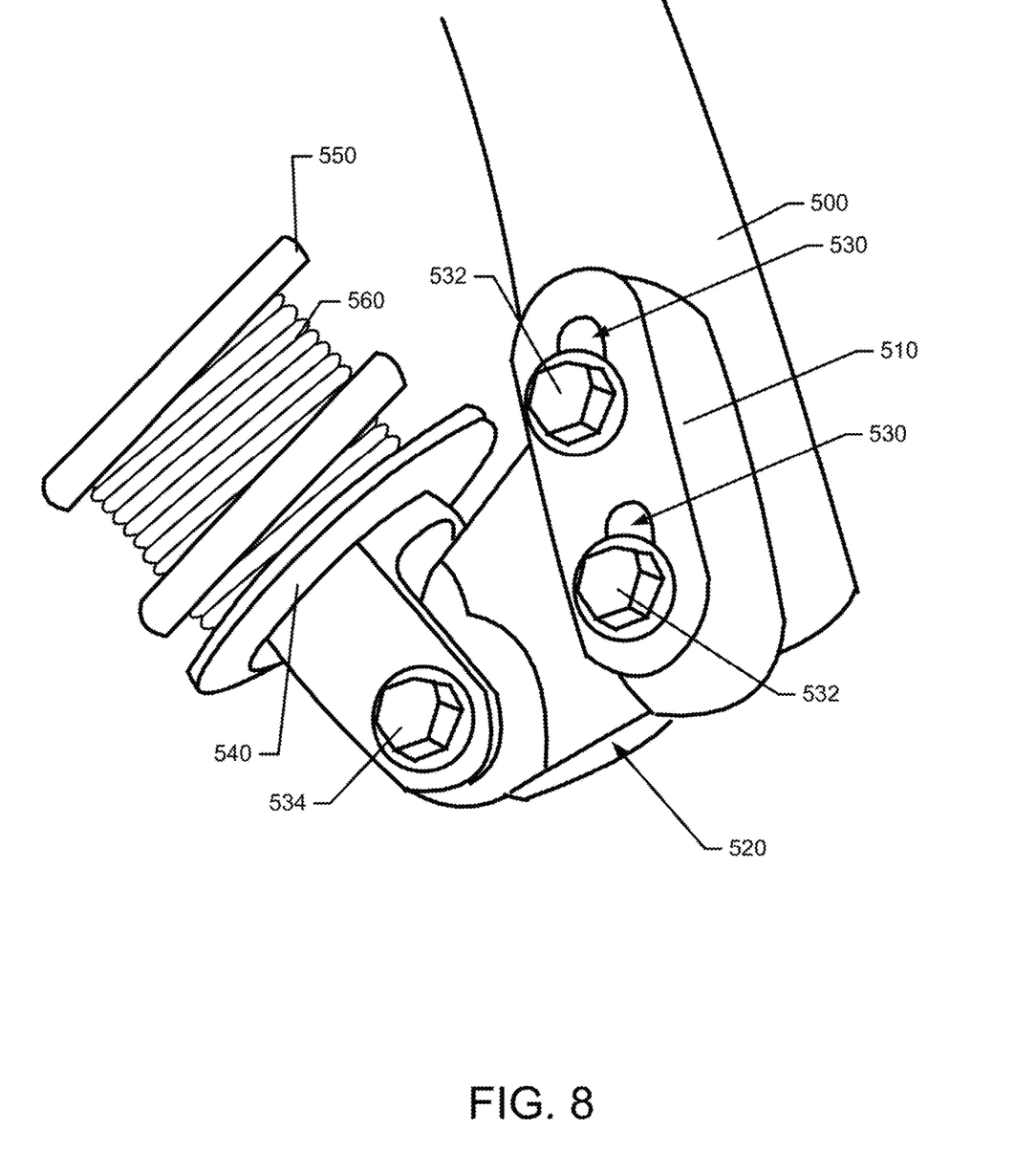
FIG. 8 illustrates a perspective view of the a bolt-in spring seat bracket that supports both a shock and spring in accordance with an example embodiment.

In some cases, the tail 268 may be provided, as described above, to support a shock. However, in some cases, the seat portion of the bolt-in spring seat bracket may support both the shock and the spring. FIG. 8 illustrates such an embodiment. Moreover, the interface of FIG. 8 is also structurally different from the examples above. In this regard, FIG. 8 shows a bracket body 500, which is a single plate. The mounting portion 510 of the perch 520 is bolted to the bracket body 500 in elongated slots 530 at a selected ride height via fasteners 532 to define single shear mounting for the perch 520. The mounting portion 510 is then rotatably coupled (e.g., via another fastener 534) to the spring seat portion 540. A spring 550 is seated on the spring seat portion 540, and is concentric with a shock 560 that is also operably coupled to the spring seat portion 540. Although the perch 520 in this embodiment is cast as two (rotatably connected) pieces, some embodiments could make the mounting portion 510 and the spring seat portion 540 as a single cast component. Moreover, the mounting portion 510 could attach to the bracket body 500 in double shear, or in tension or compression (as noted above).

Some example embodiments described herein may provide an improved suspension system that employs a varying number of fasteners or varying orientations for the fasteners in order to allow a spring seat to be bolted-in at different ride heights. As a result, vehicle ride height adjustment may be changed between different vehicle variants with lower cost and greater simplicity.

A suspension assembly for an improved vehicle suspension system may therefore be provided. The suspension assembly may include a wheel support structure operably coupling a wheel to the suspension assembly, a bolt-in spring seat bracket operably coupled to the wheel support structure, and a spring supported by the bolt-in spring seat bracket and disposed between a chassis of the vehicle and the bolt-in spring bracket. The bolt-in spring seat bracket may be adjustable to change a ride height of the vehicle. For example, the adjustability may relate to how the structure on which the spring seat is formed and the bracket are positionally related to each other. In this regard, the positional relationship may be adjusted. The assembly may be used for either or both of front and rear suspension systems.

The suspension assembly of some embodiments may include additional features, modifications, augmentations and/or the like to achieve further objectives or enhance performance of the assembly. The additional features, modifications, augmentations and/or the like may be added in any combination with each other. Below is a list of various additional features, modifications, and augmentations that can each be added individually or in any combination with each other. For example, the bolt-in spring seat bracket may include a bracket body affixed to the wheel support structure, a perch including a seat portion on which the spring is supported, and an adjustable interface connecting the perch to the bracket body. The interface may be adjustable to change the ride height of the vehicle without changing (physically, e.g., by replacement) either the bracket body or the perch. In an example embodiment, the bracket body may include a plate, and the perch may include a mounting portion. The interface may include one or more fasteners that pass through the mounting portion and the bracket body. The mounting portion may be movable relative to the bracket body prior to affixing the mounting portion to the bracket body at a selected ride height. In some embodiments, the bracket body may include a first plate and a second plate defining a receiving space therebetween. The perch may include a mounting portion receivable in the receiving space. The interface may include one or more fasteners that pass through the mounting portion and the bracket body. The mounting portion may be movable within the receiving space prior to affixing the mounting portion to the bracket body at a selected ride height. In an example embodiment, the interface may include one or more through holes formed in the mounting portion. The one or more through holes may have an elongated shape in a vertical direction to enable the one or more fasteners to be raised or lowered in the one or more through holes prior to affixing the mounting portion to the bracket body at the selected ride height. In some cases, the interface may include one or more fastener reception orifices formed in the first and second plates. The one or more fastener reception orifices may have an elongated shape in a vertical direction to enable the one or more fasteners to be raised or lowered in the one or more fastener reception orifices prior to affixing the mounting portion to the bracket body at the selected ride height. In an example embodiment, the perch may include a mounting portion and one or more support arms operably coupling the seat portion to the mounting portion to define an angle between the seat portion and the mounting portion. The mounting portion may be mounted in double shear, single shear, tension or compression relative to the bracket body. In some cases, the perch may include a mounting portion and a second seat surface disposed to face in a different direction than the seat surface. The mounting portion may be mountable in a first orientation to support the spring on the seat surface or a second orientation to support the spring on the second seat surface to change the selected ride height. In an example embodiment, the perch may be cast as a single unitary metallic component. In some cases, the suspension assembly may further include a shock, and the bracket body may further include a tail operably coupled to the shock. In an example embodiment, the seat portion may support both the shock and the spring. In some cases, the wheel support structure may include an axle tube, a control arm, or a suspension link.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A suspension assembly for a vehicle, the assembly comprising:
   a wheel support structure operably coupling a wheel to the suspension assembly;
   a bolt-in spring seat bracket operably coupled to the wheel support structure; and
   a spring supported by the bolt-in spring seat bracket and disposed between a chassis of the vehicle and the bolt-in spring bracket;
   wherein the bolt-in spring seat bracket is adjustable to change a ride height of the vehicle;
   wherein the bolt-in spring seat bracket comprises:
      a bracket body affixed to the wheel support structure;
      a perch comprising a seat portion on which the spring is supported; and
      an adjustable interface connecting the perch to the bracket body;
   wherein the adjustable interface comprises elongated or slot-shaped fastener reception orifices on the bracket body or the perch that permit moving or sliding of fasteners within the reception orifices for adjustability.

2. The suspension assembly of claim 1,
   wherein the interface is adjustable to change the ride height of the vehicle without changing either the bracket body or the perch.

3. The suspension assembly of claim 1, wherein the bracket body comprises a plate,
   wherein the perch comprises a mounting portion,
   wherein the interface comprises one or more fasteners that pass through the mounting portion and the bracket body; and
   wherein the mounting portion is movable relative to the bracket body prior to affixing the mounting portion to the bracket body at a selected ride height.

4. The suspension assembly of claim 1, wherein the bracket body comprises a first plate and a second plate defining a receiving space therebetween,
wherein the perch comprises a mounting portion receivable in the receiving space,
and
wherein the mounting portion is movable within the receiving space prior to affixing the mounting portion to the bracket body at a selected ride height.

5. The suspension assembly of claim 4, wherein the fastener reception orifices are elongated or slot-shaped in a vertical direction to enable the fasteners to be raised or lowered in the fastener reception orifices prior to affixing the mounting portion to the bracket body at the selected ride height.

6. The suspension assembly of claim 1, wherein the perch comprises a mounting portion and one or more support arms operably coupling the seat portion to the mounting portion to define an angle between the seat portion and the mounting portion, and
wherein the mounting portion is mounted in double shear, single shear, tension or compression relative to the bracket body.

7. The suspension assembly of claim 1, wherein the perch is cast as a single unitary metallic component.

8. The suspension assembly of claim 1, further comprising a shock,
wherein the bracket body further comprises a tail operably coupled to the shock.

9. The suspension assembly of claim 1, further comprising a shock,
wherein the seat portion supports both the shock and the spring.

10. The suspension assembly of claim 1, wherein the wheel support structure comprises an axle tube, a control arm, or a suspension link.

11. A suspension assembly for a vehicle, the assembly comprising:
a wheel support structure operably coupling a wheel to the suspension assembly;
a bolt-in spring seat bracket operably coupled to the wheel support structure; and
a spring supported by the bolt-in spring seat bracket and disposed between a chassis of the vehicle and the bolt-in spring bracket,
wherein the bolt-in spring seat bracket is adjustable to change a ride height of the vehicle;
wherein the bolt-in spring seat bracket comprises:
a bracket body affixed to the wheel support structure;
a perch comprising a first seat portion on which the spring is supported; and
an adjustable interface connecting the perch to the bracket body,
wherein the interface is adjustable to change the ride height of the vehicle without changing either the bracket body or the perch,
wherein the perch comprises a mounting portion and a second seat portion disposed to face in a different direction than the first seat portion, and
wherein the mounting portion is mountable in a first orientation to support the spring on the first seat portion or a second orientation to support the spring on the second seat portion to change the selected ride height.

12. A vehicle suspension system comprising:
a first suspension assembly operably coupling a first wheel to a chassis of a vehicle; and
a second suspension assembly operably coupling a second wheel to the chassis, each of the first and second suspension assemblies comprising:
a wheel support structure operably coupling the first and second wheels to the first and second suspension assemblies, respectively,
a bolt-in spring seat bracket operably coupled to the wheel support structure, and
a spring supported by the bolt-in spring seat bracket and disposed between a chassis of the vehicle and the bolt-in spring bracket,
wherein the bolt-in spring seat bracket is adjustable to change a ride height of the vehicle;
wherein the bolt-in spring seat bracket comprises:
a bracket body affixed to the wheel support structure;
a perch comprising a seat portion on which the spring is supported; and
an adjustable interface connecting the perch to the bracket body;
wherein the adjustable interface comprises elongated or slot-shaped fastener reception orifices on the bracket body or the perch that permit moving or sliding of fasteners within the reception orifices for adjustability.

13. The vehicle suspension system of claim 12, wherein the interface is adjustable to change the ride height of the vehicle without changing either the bracket body or the perch.

14. The vehicle suspension system of claim 12, wherein the bracket body comprises a first plate and a second plate defining a receiving space therebetween,
wherein the perch comprises a mounting portion receivable in the receiving space,
and
wherein the mounting portion is movable within the receiving space prior to affixing the mounting portion to the bracket body at a selected ride height.

15. The vehicle suspension system of claim 14, wherein the fastener reception orifices are elongated or slot-shaped in a vertical direction to enable the fasteners to be raised or lowered in the fastener reception orifices prior to affixing the mounting portion to the bracket body at the selected ride height.

16. The vehicle suspension system of claim 12, wherein the seat portion of the perch is a first seat portion,
wherein the perch comprises a mounting portion and a second seat portion disposed to face in a different direction than the first seat portion, and
wherein the mounting portion is mountable in a first orientation to support the spring on the first seat portion or a second orientation to support the spring on the second seat portion to change the selected ride height.

17. The vehicle suspension system of claim 12, wherein the perch is cast as a single unitary metallic component.

18. The vehicle suspension system of claim 12, wherein the wheel support structure comprises an axle tube, a control arm, or a suspension link.

* * * * *